US012150139B2

(12) United States Patent
Sun et al.

(10) Patent No.: US 12,150,139 B2
(45) Date of Patent: Nov. 19, 2024

(54) PHYSICAL DOWNLINK CONTROL CHANNEL RECEPTION WITH IMPROVED RELIABILITY

(71) Applicant: Apple Inc., Cupertino, CA (US)

(72) Inventors: Haitong Sun, Irvine, CA (US); Yushu Zhang, Beijing (CN); Huaning Niu, San Jose, CA (US); Hong He, Cupertino, CA (US); Wei Zeng, San Diego, CA (US); Dawei Zhang, Saratoga, CA (US); Chunxuan Ye, San Diego, CA (US); Oghenekome Oteri, San Diego, CA (US); Seyed Ali Akbar Fakoorian, San Diego, CA (US); Sigen Ye, Whitehouse Station, NJ (US); Jie Cui, San Jose, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 17/437,602

(22) PCT Filed: Oct. 2, 2020

(86) PCT No.: PCT/CN2020/119783
§ 371 (c)(1),
(2) Date: Sep. 9, 2021

(87) PCT Pub. No.: WO2022/067849
PCT Pub. Date: Apr. 7, 2022

(65) Prior Publication Data
US 2022/0304034 A1 Sep. 22, 2022

(51) Int. Cl.
*H04W 24/10* (2009.01)
*H04L 1/00* (2006.01)
(Continued)

(52) U.S. Cl.
CPC .......... *H04W 72/23* (2023.01); *H04L 1/0038* (2013.01); *H04L 1/08* (2013.01); *H04W 72/0446* (2013.01);
(Continued)

(58) Field of Classification Search
CPC ... H04L 5/0053; H04L 1/0038; H04L 5/0035; H04L 1/085; H04L 5/0094;
(Continued)

(56) References Cited

U.S. PATENT DOCUMENTS

| 2019/0349147 A1 | 11/2019 | Aiba et al. |
| 2020/0045569 A1 | 2/2020 | Seo et al. |

(Continued)

FOREIGN PATENT DOCUMENTS

| CN | 107438972 | 12/2017 |
| CN | 109802758 A | 5/2019 |

(Continued)

OTHER PUBLICATIONS

International Search Report for PCT Patent Application No. PCT/CN2020/119783; mailed Jul. 1, 2021.
(Continued)

*Primary Examiner* — Anez C Ebrahim
(74) *Attorney, Agent, or Firm* — Kowert, Hood, Munyon, Rankin & Goetzel, P.C.

(57) ABSTRACT

This disclosure relates to techniques for receiving physical downlink control channel transmissions with improved reliability in a wireless communication system. A wireless device may establish a wireless link with a cellular base station. The wireless device may receive downlink control channel configuration information from the cellular base station. The downlink control channel configuration information may configure control resources associated with multiple transmission reception points in a search space for (Continued)

the wireless device. The wireless device may perform downlink control channel candidate blind decoding during a monitoring occasion configured by the search space configured with control resources associated with multiple transmission reception points.

20 Claims, 7 Drawing Sheets

(51) Int. Cl.
H04L 1/08 (2006.01)
H04W 72/0446 (2023.01)
H04W 72/0453 (2023.01)
H04W 72/1273 (2023.01)
H04W 72/23 (2023.01)

(52) U.S. Cl.
CPC ... H04W 72/0453 (2013.01); H04W 72/1273 (2013.01)

(58) Field of Classification Search
CPC ............. H04W 72/1273; H04W 72/23; H04W 72/0446; H04W 72/0453
See application file for complete search history.

(56) References Cited

U.S. PATENT DOCUMENTS

| | | | |
|---|---|---|---|
| 2020/0154467 A1 | 5/2020 | Gong | |
| 2022/0077969 A1* | 3/2022 | Kim | H04L 1/1854 |
| 2023/0318761 A1* | 10/2023 | Jang | H04W 72/1263 |
| | | | 370/329 |

FOREIGN PATENT DOCUMENTS

| | | |
|---|---|---|
| CN | 110301147 A | 10/2019 |
| CN | 110731112 A | 1/2020 |
| WO | 2019244222 | 12/2019 |
| WO | 2020102105 A1 | 5/2020 |

OTHER PUBLICATIONS

Qualcomm Inc. "PDCCH-based power saving channel design"; 3GPP RSG RAN WG1 #99 R1-1912970; Nov. 22, 2019.
Extended European Search Report for EP Patent Application No. 20955869.1; Oct. 5, 2023.
Samsung "Further Enhancements on MIMO for NR"; 3GPP TSG RAN Meeting #89e RP-201469; Sep. 14, 2020.
NTT Docomo et al. "Discussion on MTRP for reliability"; 3GPP TSG RAN WG1 #102-e R1-2006719; Aug. 17, 2020.
Office Action for CN Patent Application No. 202080105764.0; Jun. 28, 2024.

* cited by examiner

| Serving Cell ID | | | C | CORESET ID |
|---|---|---|---|---|
| CORESET ID | | C | TCI State ID | |
| TCI State ID | CORESET ID | | TCI State ID | |
| TCI State ID | | R | R | R | R | R |

FIG. 7

| Physical Cell ID | | | | |
|---|---|---|---|---|
| Physical Cell ID | C | CORESET ID | | TCI State ID |
| TCI State ID | | | C | CORESET ID |
| CORESET ID | TCI State ID | | | |

FIG. 8

PHYSICAL DOWNLINK CONTROL CHANNEL RECEPTION WITH IMPROVED RELIABILITY

FIELD

The present application relates to wireless communications, and more particularly to systems, apparatuses, and methods for receiving physical downlink control channel transmissions with improved reliability in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for receiving physical downlink control channel transmissions with improved reliability in a wireless communication system.

According to the techniques described herein, a wireless device may receive downlink control channel configuration information that configures downlink control resources associated with multiple transmission reception points in a search space for the wireless device. The wireless device may perform blind decoding, and potentially receive downlink control information, in accordance with the configuration of downlink control resources associated with multiple transmission reception points in the search space.

According to some embodiments, the wireless device may receive downlink control information that is jointly encoded by multiple transmission reception points, or that includes repetitions of the downlink control information (which may be encoded in the same way or may have different redundancy versions) provided by different transmission reception points.

Such configuration and provision of downlink control information may help improve the reliability of downlink control information communications by making use of the potential for beam diversity that may be possible when downlink control information can be provided by multiple transmission reception points, at least according to some embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 7 illustrates aspects of an exemplary MAC control element that can be used to update the TCI for multiple CORESETs, according to some embodiments;

FIG. 8 illustrates aspects of an exemplary MAC control element that can be used to update a CORESET in another cell, according to some embodiments;

Figure 1:
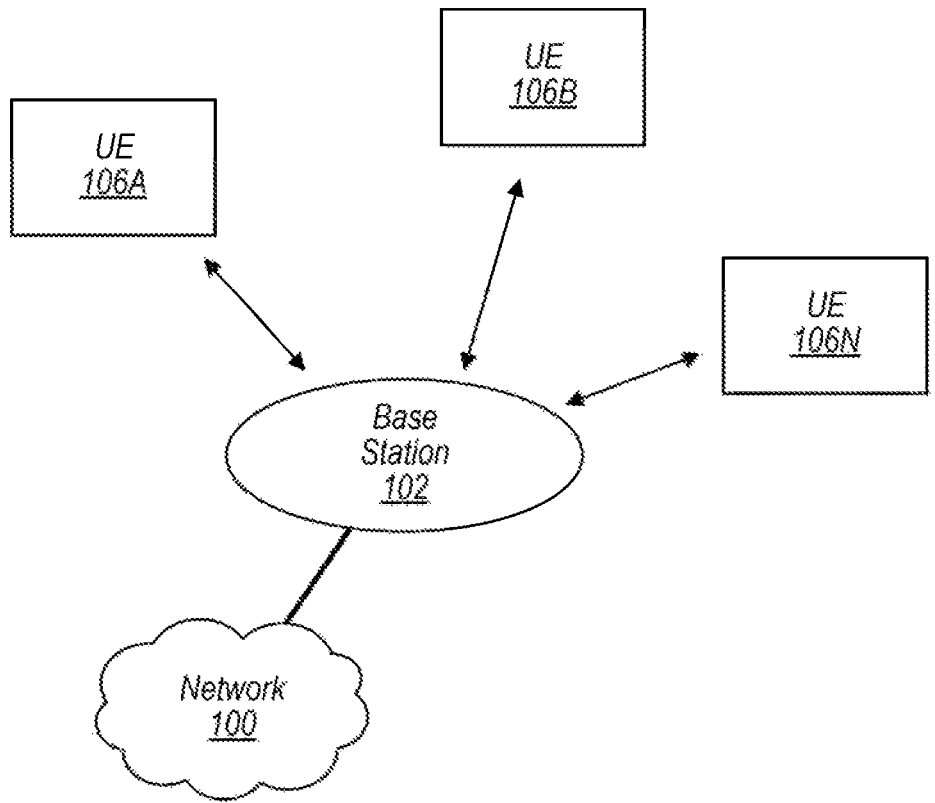
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
 UE: User Equipment
 RF: Radio Frequency
 BS: Base Station
 GSM: Global System for Mobile Communication
 UMTS: Universal Mobile Telecommunication System
 LTE: Long Term Evolution
 NR: New Radio
 TX: Transmission/Transmit
 RX: Reception/Receive
 RAT: Radio Access Technology
 TRP: Transmission-Reception-Point
 DCI: Downlink Control Information
 CORESET: Control Resource Set
 CSI: Channel State Information
 CSI-RS: Channel State Information Reference Signals

Terms

The following is a glossary of terms that may appear in the present disclosure:
 Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.
 Carrier Medium—a memory medium as described above, as well as a physical transmission medium, such as a bus, network, and/or other physical transmission medium that conveys signals such as electrical, electromagnetic, or digital signals.
 Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.
 User Equipment (UE)(or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.
 Wireless Device—any of various types of computer systems or devices that perform wireless communications. A wireless device can be portable (or mobile) or may be stationary or fixed at a certain location. A UE is an example of a wireless device.
 Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device,
 Base Station (BS)— The term "Base Station" has the full breadth of its ordinary meaning, and at least includes a wireless communication station installed at a fixed location and used to communicate as part of a wireless telephone system or radio system.
 Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.
 Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts. "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
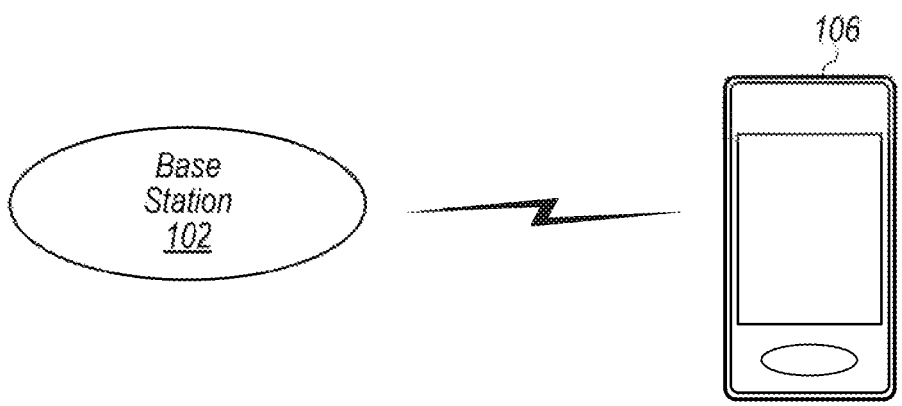
FIG. 2 illustrates an exemplary base station in communication with an exemplary wireless user equipment WE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 160B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UNITS (WCDMA). LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform robust uplink data transmission techniques, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 10 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (IAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
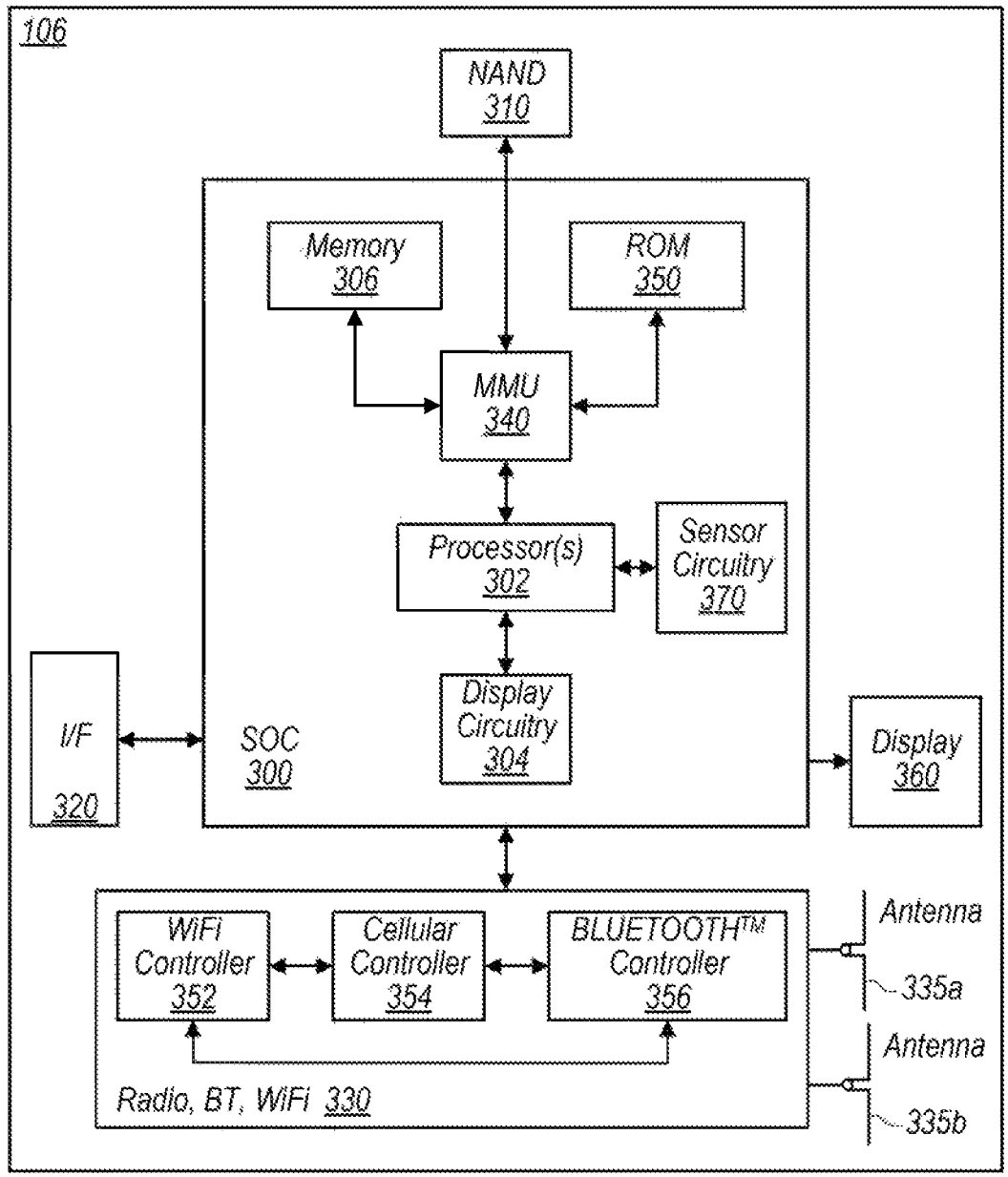
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform downlink control reception techniques with improved reliability, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may intemperate with other components as shown in FIG. 3, to perform downlink control reception techniques with improved reliability according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
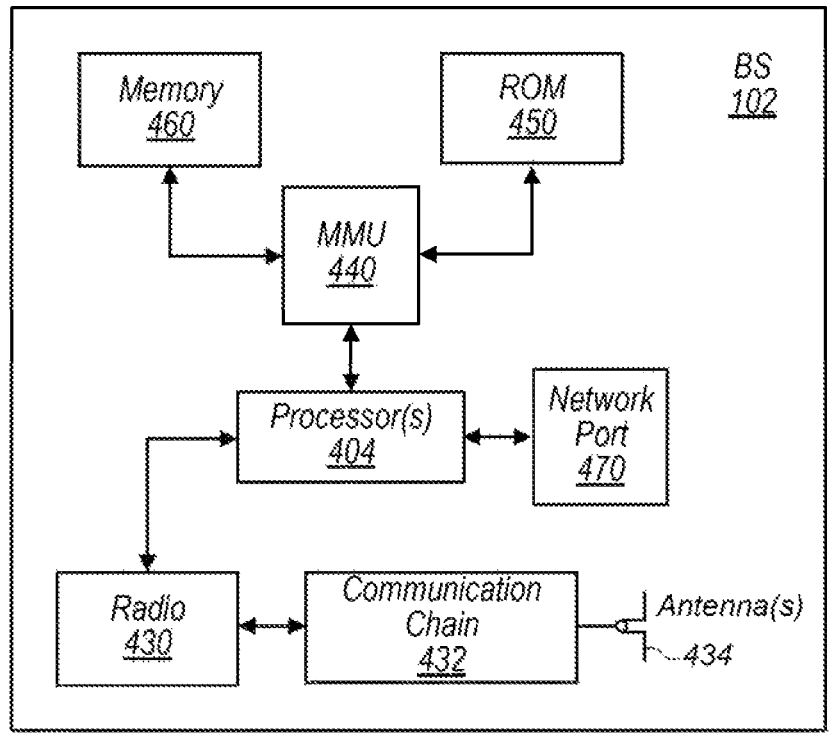
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
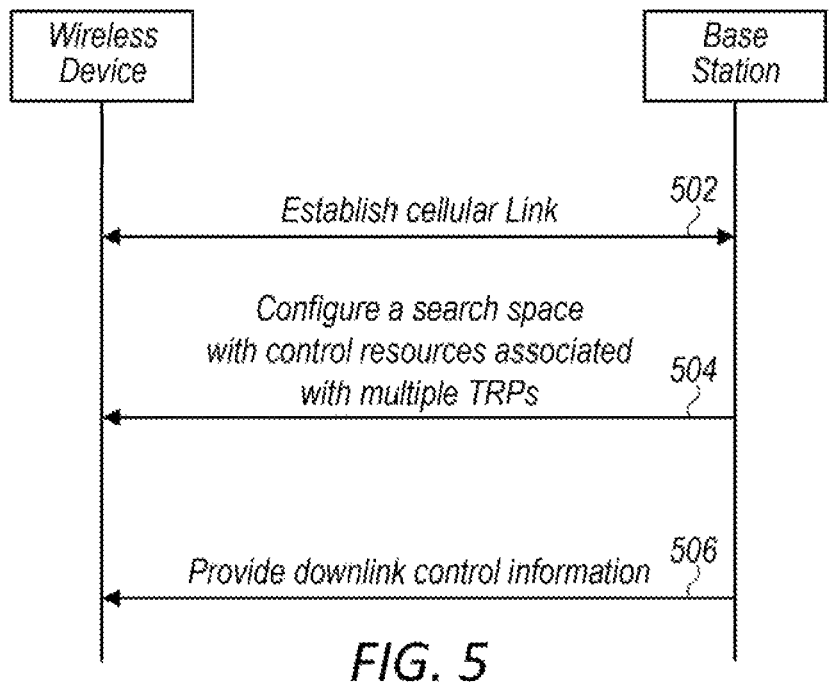
FIG. 5 is a flowchart diagram illustrating aspects of an exemplary possible method for providing physical downlink control channel transmissions with improved reliability in a wireless communication system, according to some embodiments.

FIG. 5—Downlink Control Reception Techniques with Improved Reliability

Wireless communication is being used for an increasingly broad set of use cases. For at least some such types of communications, the robustness and reliability of the communications may be of particular importance. Accordingly, it may be useful to expand the range of types of communications that can be performed in a highly robust and reliable manner.

One such area may include downlink control communications, and/or other communications that may be performed on the physical downlink control channel (PDCCH) of a cellular communication system. In particular, it may be useful to provide techniques for providing downlink control information that can benefit from multiple-input multiple-output (MIMO) capabilities and multi-beam diversity.

Accordingly, FIG. 5 is a flowchart diagram illustrating a method for performing downlink control communications with improved reliability in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario (and/or potentially in other scenarios), the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the cellular base station may provide downlink control channel configuration information (which may include control resource set (CORESET) and/or search space configuration information, among various possibilities) to the wireless device. At least according to some embodiments, configuring one or more CORESETs may indicate certain downlink control channel (e.g., PDCCH) monitoring resources in the frequency domain, while configuring one or more search spaces may indicate a time domain pattern during which to search for downlink control channel communications. Thus, the configuring a search space may effectively configure a set of downlink control channel monitoring occasions, such that in each monitoring/decoding occasion, a wireless device may perform hypothetical testing (blind decoding) to decode potential downlink control information from various possible downlink control channel candidates that may be used for the downlink control channel. e.g., in accordance with the CORESET and search space configuration provided to the wireless device, at least in some instances. Note that other downlink control channel configuration approaches, including variations on such an approach to downlink control channel configuration, are also possible.

The downlink control channel configuration information may be provided using RRC control signaling, MAC signaling (e.g., MAC CE), or a combination thereof, among various possibilities. The downlink control channel configuration information may configure control resources associated with multiple transmission reception points (TRPs) in a search space for the wireless device. For example, the search space may be configured with multiple CORESETs, where each CORESET is associated with a different TRP. Thus, it might be the case that the search space is configured with a first CORESET associated with a first TRP and a second CORESET associated with a second TRP.

To configure the search space with multiple CORESETs, it may be the case that various parameters of each of the CORESETs of the search space may be configured independently, e.g., such that different configurations may be possible. For example, each CORESET of the search space may be configured with a different identifier. Thus, each CORESET may be configured with a different CORESETPoolIndex, or may be associated with a different physical cell identifier (PCI), such that each CORESET may correspond to one TRP. Additionally, the downlink control channel configuration information may configure each CORESET of the search space with a different beam configuration (e.g., a different TCI may be configured by MAC-CE for each CORESET). In some instances, the downlink control channel configuration information may further (or alternatively) configure different slot periodicity, slot offset, and/or symbols within a slot for each CORESET of the search space.

It may be useful, at least in some instances, to support the capability to update the TCI for multiple CORESETs at the same time (e.g., using the same MAC CE), e.g., if it is possible for a search space to be configured with control resources associated with multiple TCIs. Accordingly, in some embodiments, the cellular base station may provide a MAC-CE to the wireless device that is configured to modify the beam configuration for each of the multiple CORESETS of the search space, e.g., using a MAC-CE format that supports modification of the beam configuration for each of multiple CORESETs. In some instances, the MAC-CE format may further support modifying the beam configuration of CORESETs associated with a different cell (e.g., having a different PCI than the cell that provides the MAC-CE).

The downlink control channel configuration information may configure two CORESETs in a search space according to a consistent transmission pattern, at least according to some embodiments. For example, as one possibility, a time division multiplexed transmission pattern may be used, e.g., such that the CORESETs are non-overlapping in the time domain and the frequency domain resource allocation of the CORESETs is the same. As another possibility, a frequency division multiplexed pattern may be used, e.g., such that the CORESETs are non-overlapping in the frequency domain and the time domain resource allocation of the CORESETs is the same. As a still further possibility, a time and frequency division multiplexed pattern may be used, e.g., such that the CORESETs are non-overlapping in both the time domain and the frequency domain. As yet another possibility, a spatial division multiplexed pattern may be used, e.g., such that the multiple CORESETs are fully overlapping in both the time domain and the frequency domain. In such a scenario, the wireless device may be able to distinguish the CORESETs based at least in part on their respective beam configurations and/or using digital signal processing, among various possibilities.

At least according to some embodiments, it may be helpful (e.g., to simplify wireless device physical downlink control channel (PDCCH) hypothesis testing) to restrict certain CORESET parameters when multiple CORESETs are configured in a search space. For example, it may be the case that the CORESETs are configured (explicitly or implicitly) to have the same periodicity, the same control channel element (CCE) to resource element group (REG) mapping, the same resource element group bundle size configuration, and/or the same PDCCH candidate configuration. Alternatively, it may be possible for one or more such parameters to differ between multiple CORESETs that are configured in the same search space, if desired.

In some instances, the search space may be configured with one CORESET, and multiple TCIs (e.g., each potentially associated with a different TRP) may be configured for the CORESET. In such a scenario, it may be the case that PDCCH repetition is configured, and that different repetitions may be associated with different TRPs, at least according to some embodiments.

Note that the wireless device may be configured with multiple CORESETs and multiple search spaces, and that other such search spaces could be similarly configured with multiple CORESETs and/or control resources associated with multiple TRPs, according to various embodiments.

In 506, the cellular base station (and potentially one or more other cellular base stations/TRPs) may provide downlink control information (DCI) to the wireless device using one or more CORESETs included in the search space. The wireless device may perform blind decoding during one or more monitoring occasions configured by the search space (e.g., in accordance with the downlink control channel configuration information), based on which the wireless device may detect and decode the downlink control information provided by the cellular base station (and potentially the one or more other cellular base stations/TRPs).

According to some embodiments, the payload of the DCI may be provided from multiple TRPs, according to one of various possible encoding techniques. For example, as one possibility, the payload of the DCI may be jointly encoded across multiple TRPs. In such a scenario, a network entity may coordinate the multiple TRPs for the joint encoding of the DCI, at least as one possibility. As another example, repetitions of the payload of the DCI that are encoded in the same way may be provided to the wireless device from each of the multiple TRPs. As still another example, repetitions of the payload of the DC that are encoded with different redundancy versions may be provided to the wireless device from each of the multiple TRPs.

As previously noted herein, in some instances when multiple CORESETs are configured in a search space, those CORESETs may be configured with the same PDCCH candidate configuration. For example, each such CORESET may have the same aggregation level configuration and the same number of candidates per aggregation level. In such a scenario, it may accordingly be the case that a one-to-one mapping between PDCCH candidates in each such CORESET is effectively configured, and can be assumed by the wireless device when performing blind decoding of the search space. Thus, it may be the case that configuration of multiple CORESETs in a search space may be possible without increasing the total number of PDCCH candidates for which the wireless device is assumed to be able to perform PDCCH candidate hypothesis testing.

As also previously noted herein, in some instances, it may be the case that the same CORESET can be configured with multiple TCIs, thereby potentially configuring control resources associated with multiple TRPs in a single search space. In such a scenario, it may also be the case that a one-to-one mapping between PDCCH candidates associated with each TRP can be assumed by the wireless device when performing blind decoding of the search space. Thus, it may be the case that such a configuration may also be possible without increasing the total number of PDCCH candidates for which the wireless device is assumed to be able to perform PDCCH candidate hypothesis testing.

Note that when the same DCI is transmitted in a PDCCH candidate from multiple TRPs, either with PDCCH repetition or with PDCCH multi-beam transmission, there may be multiple options with respect to the number of blind detection and non-overlapping control channel elements counted. In particular, it may be the case that the number of DC hypothetical decoding may be double counted (e.g., each may be counted repetition or portion of the multi-beam transmission may be counted separately), or may not be double counted (e.g., all repetitions/portions of the DCI transmission may be counted together), according to various embodiments.

Thus, the method of FIG. 5 may be used to provide a framework for configuring and performing downlink control transmissions more reliably in a cellular communication system. Such a framework may be particularly useful in supporting PDCCH search space, PDCCH encoding, and/or PDCCH candidate TCI configuration improvements making use of the potential availability of multiple TRPs to provide increased beam diversity for downlink control communications, among other possible benefits, at least according to some embodiments.

FIGS. 6-15 and Additional Information

FIGS. 6-15 illustrate further aspects that might be used in conjunction with the method of FIG. 5 if desired. It should be noted, however, that the exemplary details illustrated in and described with respect to FIGS. 6-15 are not intended to be limiting to the disclosure as a whole: numerous variations and alternatives to the details provided herein below are possible and should be considered within the scope of the disclosure.

In third generation partnership program (3GPP) cellular communication, a physical downlink control channel (PDCCH) may be used to provide downlink control information (DCI) to wireless devices. In existing 3GPP PDCCH design, a control resource set (CORESET) may be configured (e.g., using RRC control signaling such as a "ControlResourceSet" Information Element), potentially including indicating the frequency domain resource allocation of the CORESET and the duration of the CORESET (e.g., 1/2/3 symbols). According to some embodiments, it may be the case that up to 5 CORESETs can be configured per bandwidth part (BWP) for multi-DCI multi transmit-receive-point (TRP) operation, and up to 3 CORESETs can be configured per BWP for other operations. Additionally, it may be the case that up to 4 BWPs can be configured per component carrier (CC), and up to 16 total CORESETs can be configured per CC.

The time domain pattern for performing PDCCH monitoring may also be configured (e.g., using RRC signaling such as a "SearchSpace" Information Element). At least according to some embodiments, it may be the case that each SearchSpace may contain only one CORESET, and that up to 10 SearchSpaces may be configured per BWP per CC.

According to 3GPP Release 15, it may be possible to update the transmission control indicator (TCI) for a CORESET (PDCCH) with the same ID using one media access control (MAC) control element (CE). According to 3GPP Release 16, it may be possible to update the TCI for a CORESET with an indicated ID in a list of CCs using one MAC CE.

The PDCCH reliability may be relatively limited according to existing designs, for example due the maximum duration of the PDCCH being potentially limited to 3 symbols or less, because each CORESET can be configured with only one beam (e.g., no multi-beam diversity), and PDCCH aggregation may not be supported.

Accordingly, techniques are presented herein that may improve the reliability of PDCCH communications, for example including one or more techniques relating to search space configuration, PDCCH encoding, and PDCCH candidate TCI configuration.

Figure 6:
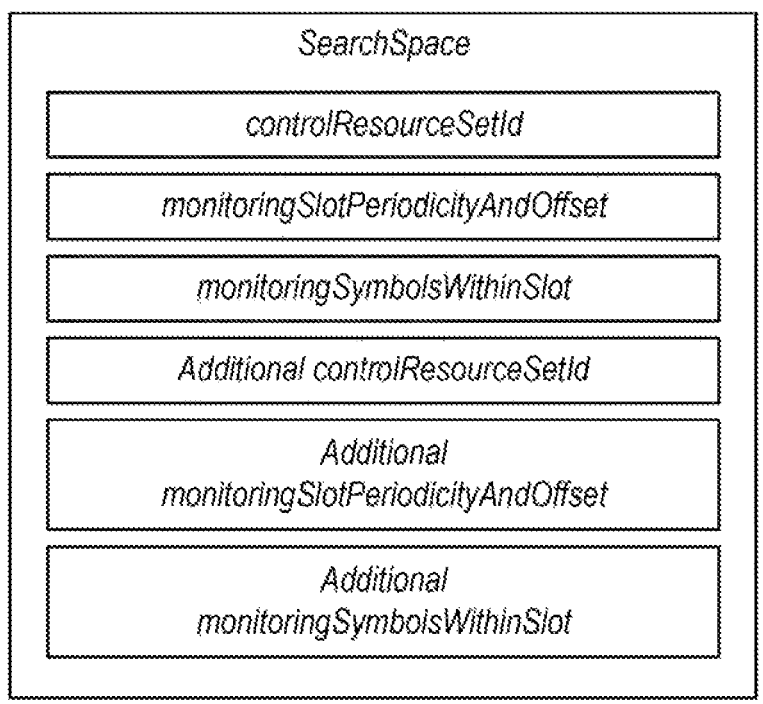
FIG. 6 illustrates aspects of an exemplary possible scenario in which a single search space can be configured with multiple CORESETs, according to some embodiments.

As one such possible technique, it may be possible to configure a search space with 2 CORESETs. According to some embodiments, each such CORESET may correspond to one TRP. It may be the case that each CORESET is configured with a different CORESETPoolIndex, and/or each CORESET is associated with a different physical cell ID (PCI), it may be possible to independently configure the beam or TCI of each CORESET, e.g., by MAC-CE. For each CORESET, it may be the case that the monitoringSlotPeriodicityAndOffset and monitoringSymbolsWithinSlot can be separately configured or can be the same. FIG. 6 illustrates aspects of such an exemplary possible scenario in which a single search space can be configured with multiple CORESETs, according to some embodiments.

It may further be possible to support use of a single MAC-CE to update the TCI for multiple CORESETs at the same time, FIG. 7 illustrates one possible MAC-CE design for such a purpose. In such a scenario, it may be possible to include a 5 bit serving cell ID field, a 'C' field to indicate whether configuration information for another CORESET is following within the MAC-CE (e.g., where C=1 indicates that another CORESET is following and C=0 indicates the final CORESET of the MAC-CE), a 4 bit CORESET ID field, a TCI State ID field including a 6 bit index to a list of TCIs configured by RRC for PDCCH, and one or more reserved bits 'R', at least as one possibility.

Still further, it may be possible to support use of a single MAC-CE to update one or more CORESETs associated with a different PCI. FIG. 8 illustrates one possible MAC-CE design for such a purpose. In such a scenario, it may be possible to include a 10 bit PCI field, as well as a 'C' field, a 4 bit CORESET ID field, and a 6 bit TCI State ID field, at least as one possibility.

When a search space contains two CORESETs, it may be possible for those CORESETs to be configured in the time- and frequency domains according to any of a variety of possible patterns. FIGS. 9-12 illustrate exemplary aspects of various possible such transmission patterns that could be used to include multiple CORESETs in a search space, according to some embodiments.

Figure 9:
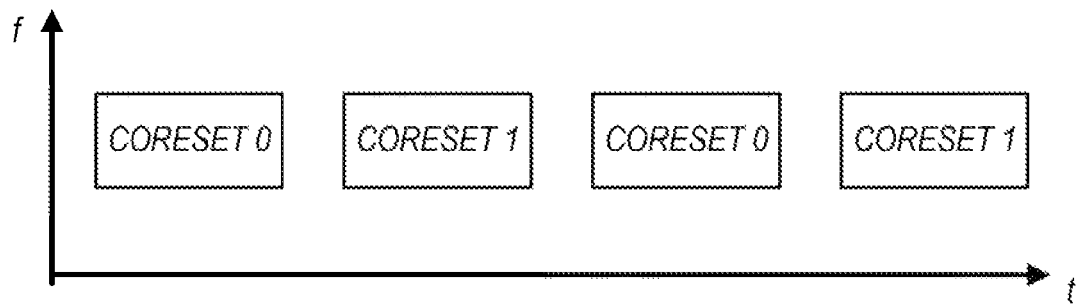
FIGS. 9-12 illustrate exemplary aspects of various possible transmission patterns that could be used to include multiple CORESETs in a search space, according to some embodiments.

In the pattern illustrated in FIG. 9, a time division multiplexing (TDM) approach may be used, such that the two CORESETs are non-overlapping in the time domain. In this case, the frequency domain resource allocation of the two CORESETs may be the same (e.g., may be fully overlapping).

Figure 10:
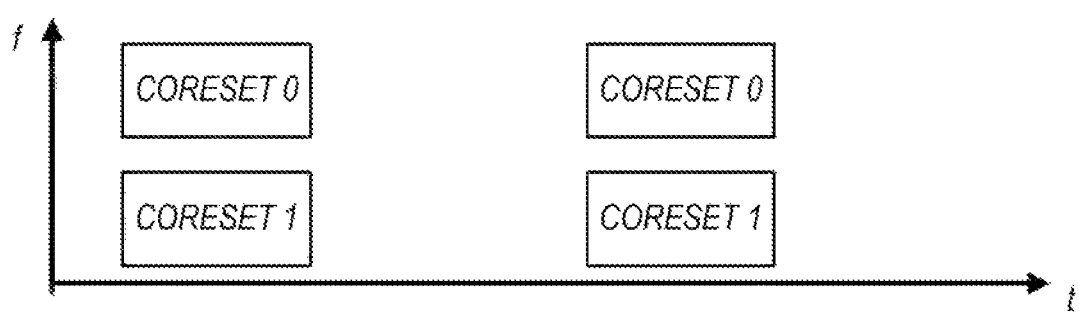

In the pattern illustrated in FIG. 10, a frequency division multiplexing (FDM) approach may be used, such that the two CORESETs are non-overlapping in the frequency domain; the frequency domain resource allocation of the two CORESETs may be shifted relative to each other. In this case, the time domain resource allocation of the two CORESETs may be the same (e.g., may be fully overlapping).

Figure 11:
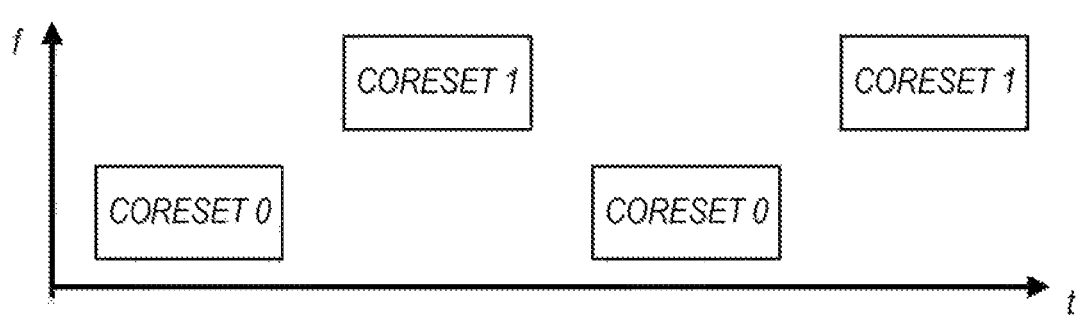

In the pattern illustrated in FIG. 11, a TDM and FDM approach may be used, such that the two CORESETs are non-overlapping in the time domain and also non-overlapping in the frequency domain.

Figure 12:
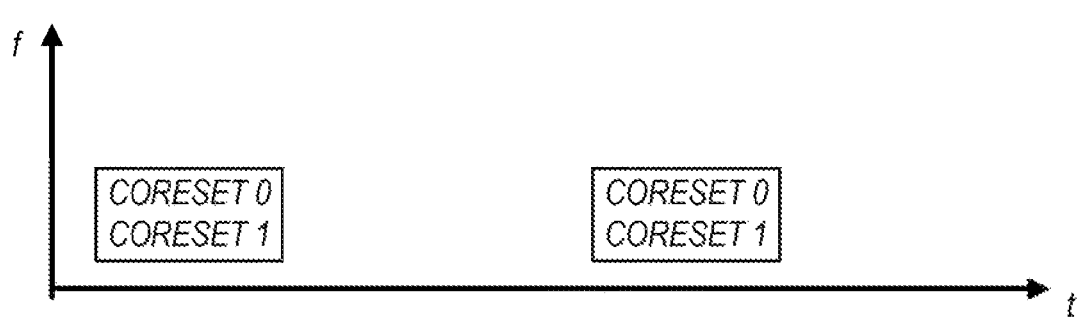

In the pattern illustrated in FIG. 12, a spatial division multiplexing approach may be used, in which the two CORESETs are fully overlapping in both the time domain and the frequency domain. In such a case, different beams and/or signal processing may be used to differentiate the CORESET signals.

When a search space contains two CORESETs, it may be possible to establish one or more restrictions to simplify the UE PDCCH hypothesis testing, e.g., when performing blind decoding. For example, it may be possible to establish that two such CORESETs may have the same periodicity, the same control channel element (CCE) to resource element group (REG) mapping, the same REG bundle size configuration, and/or the same PDCCH candidate configuration, according to various embodiments.

Figure 13:
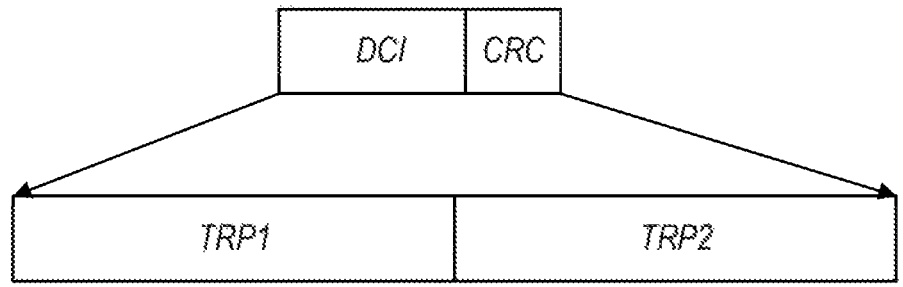
FIGS. 13-15 illustrate various possible techniques for multiple TRPs to transmit downlink control information payload to a wireless device, according to some embodiments.
Figure 14:
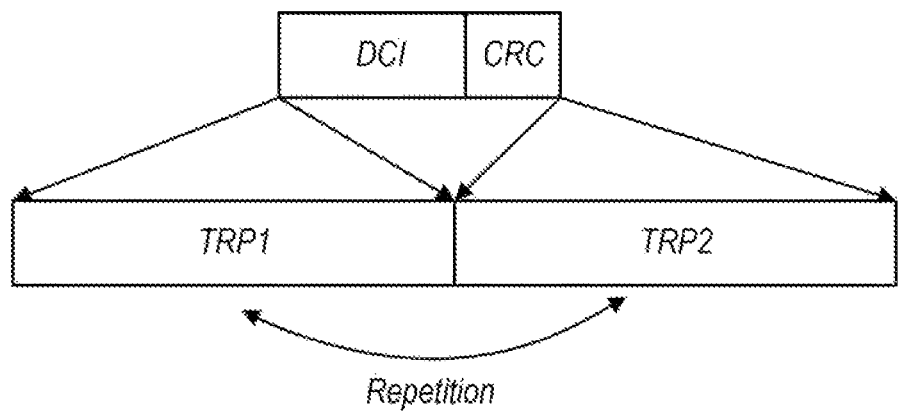
Figure 15:
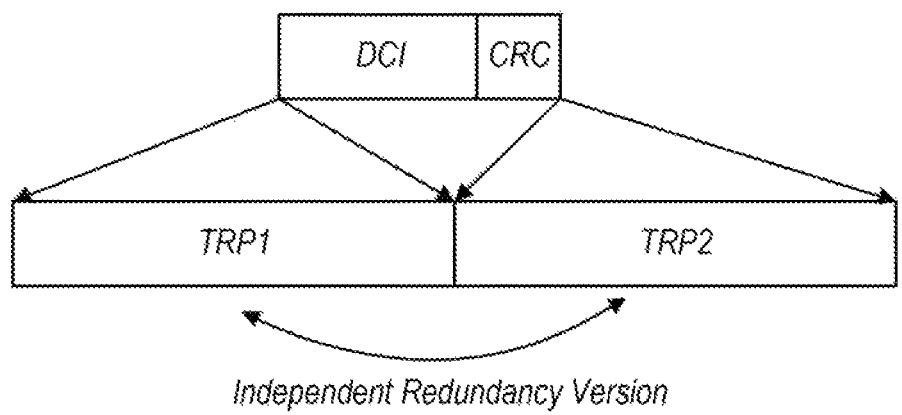

As previously noted, one or more PDCCH encoding techniques may also or alternatively be introduced to potentially improve PDCCH reliability, for example including techniques that may make use of a multi beam (e.g., multi-TRP) PDCCH configuration. FIGS. 13-15 illustrate various possible such techniques for multiple TRPs to transmit a downlink control information payload to a wireless device, according to some embodiments. It may be the case that when DC is transmitted from two TRPs, the two TRPs transmit the same payload. The encoding of the same payload across the two TRPs can be performed in any of multiple possible ways. As one possibility, FIG. 13 illustrates a scenario in which the same payload is jointly encoded across two TRPs. As another possibility, FIG. 14 illustrates a scenario in which the same payload is encoded in the same way in each TRP (e.g., each TRP may transmit an identical repetition). As a still further possibility, FIG. 15 illustrates a scenario in which the same payload is encoded with a different redundancy version by each TRP.

As also previously noted, it may be possible to introduce PDCCH candidate TCI configuration techniques to potentially improve PDCCH reliability, e.g., in conjunction with supporting potential multi-TRP PDCCH operation. For example, when two CORESETs are configured with each CORESET corresponding to one TRP, it may be the case that the CORESETs have the same PDCCH candidate configuration. This may include, for example, the same aggregation level configuration and the same number of candidates per aggregations level. It may be the case that a one-to-one mapping between PDCCH candidates in each such CORESET can be assumed. Thus, it may be the case that the UE need not assume an increase in the total number of PDCCH candidates for hypothesis testing in such a scenario. According to some embodiments, the PDCCH candidate configuration may be provided using a SearchSpace information element. e.g., using a nrofCandidates field, such as further illustrated and described in section 6.3.2 of 3GPP TS 38.331 v.16.1.0.

It may also be possible for the same CORESET to be configured for multiple TRPs, e.g., with that CORESET being configured with different TCIs (e.g., each TCI representing a different TRP). In such a scenario, PDCCH repetition may be configured, such that repetitions may be provided by different TRPs. It may be the case that a one-to-one mapping between PDCCH candidates in each CORESET can be assumed. Thus, it may be the case that the UE need not assume an increase in the total number of PDCCH candidates for hypothesis testing in such a scenario.

Note that when the same DCI is transmitted in a PDCCH candidate from multiple TRPs, either with PDCCH repetition or with PDCCH multi-beam transmission, there may be multiple possibilities with respect to the number of blind detection (BD) and non-overlapping CCE instances such transmissions may be considered. For example, as one possibility, the transmissions may be double counted; as another possibility, the transmissions may not be double counted.

In the following further exemplary embodiments are provided.

One set of embodiments may include a baseband processor configured to perform operations comprising: establishing a wireless link with a cellular base station; receiving control resource set (CORESET) configuration information from the cellular base station, wherein the CORESET configuration information configures a search space with multiple CORESETs; and performing physical downlink control channel (PDCCH) candidate blind decoding during a monitoring occasion configured by the search space.

According to some embodiments, the CORESET configuration information configures the search space with a first CORESET associated with a first transmission reception point (TRP) and a second CORESET associated with a second TRP.

According to some embodiments, the CORESET configuration information configures each CORESET of the search space with a different beam configuration.

According to some embodiments, the CORESET configuration information configures different slot periodicity, slot offset, and/or symbols within a slot for each CORESET of the search space.

According to some embodiments, the baseband processor is further configured to perform operations comprising: receiving a media access control (MAC) control element (CE) configured to modify a beam configuration for each of the multiple CORESETs.

According to some embodiments, the MAC-CE indicates that the multiple CORESETs are associated with a different cell than a cell from which the MAC-CE is received.

According to some embodiments, the CORESET configuration information configures the search space with multiple CORESETs according to a transmission pattern that is one of: time division multiplexed such that the multiple CORESETs are non-overlapping in a time domain and a frequency domain resource allocation of the multiple CORESETs is the same; frequency division multiplexed such that the multiple CORESETs are non-overlapping in a frequency domain and a time domain resource allocation of the multiple CORESETs is the same; time and frequency division multiplexed such that the multiple CORESETs are non-overlapping in the time domain and also non-overlapping in the frequency domain; spatial division multiplexed such that the multiple CORESETs are fully overlapping in both the time domain and the frequency domain.

Another set of embodiments may include a wireless device, comprising: an antenna; a radio operably coupled to the antenna; and a processor operably coupled to the radio; wherein the wireless device is configured to: establish a wireless link with a cellular base station; receive downlink control channel configuration information from the cellular base station, wherein the downlink control channel configuration information configures control resources associated with multiple transmission reception points (TRPs) in a search space for the wireless device; and perform downlink control channel candidate blind decoding during a monitoring occasion configured by the search space configured with control resources associated with multiple TRPs.

According to some embodiments, the downlink control channel configuration information configures multiple control resource sets (CORESETs) in the search space, wherein each CORESET in the search space is associated with a different TRP.

According to some embodiments, for wireless device blind decoding hypothesis testing, the CORESETs in the search space are configured with one or more of: a same periodicity; a same control channel element (CCE) to resource element group (REG) mapping; a same REG bundle size configuration; or a same physical downlink control channel (PDCCH) candidate configuration.

According to some embodiments, the downlink control channel configuration information configures multiple transmission control indicators (TCIs) for a control resource set (CORESET), wherein each TCI is associated with a different TRP, wherein the downlink control channel configuration information configures physical downlink control channel (PDCCH) repetition, wherein different repetitions are associated with different TRPs.

According to some embodiments, the wireless device is further configured to: receive downlink control information (DCI) based at least in part on the blind decoding performed during the monitoring occasion configured by the search space configured with control resources associated with multiple TRPs, wherein the DCI is jointly encoded across multiple TRPs.

According to some embodiments, the wireless device is further configured to: receive downlink control information (DCI) based at least in part on the blind decoding performed during the monitoring occasion configured by the search space configured with control resources associated with multiple TRPs, wherein at least one repetition of the DCI is received from each of at least two TRPs.

According to some embodiments, the wireless device is further configured to: receive downlink control information (DC) based at least in part on the blind decoding performed during the monitoring occasion configured by the search space configured with control resources associated with multiple TRPs, wherein a payload of the DC is received from each of at least two TRPs, wherein the payload is received with a different redundancy version from each of the at least two TRPs.

Yet another set of embodiments may include a method, comprising: by a wireless device: establishing a wireless link with a cellular base station; receiving downlink control channel configuration information from the cellular base station, wherein the downlink control channel configuration information configures control resources associated with multiple transmission reception points (TRPs) in a search space for the wireless device; and performing downlink control channel candidate blind decoding during a monitoring occasion configured by the search space configured with control resources associated with multiple TRPs.

According to some embodiments, the downlink control channel configuration information configures multiple control resource sets (CORESETs) in the search space, wherein each CORESET in the search space is associated with a different TRP.

According to some embodiments, the downlink control channel configuration information configures the multiple CORESETs in the search space with the same physical downlink control channel (PDCCH) candidate aggregation level configuration and number of PDCCH candidates per aggregation level, wherein a one-to-one mapping between PDCCH candidates in each CORESET is assumed by the wireless device when performing blind decoding during the monitoring occasion configured by the search space.

According to some embodiments, the downlink control channel configuration information configures different CORESETs of the search space with one or more of: different beam configurations; different slot periodicities; different slot offsets; or different symbols within a slot.

According to some embodiments, the downlink control channel configuration information configures multiple transmission control indicators (TCIs) for a control resource set (CORESET), wherein each TCI is associated with a different TRP.

According to some embodiments, a one-to-one mapping between PDCCH candidates associated with each TCI is assumed by the wireless device when performing blind decoding during the monitoring occasion configured by the search space.

A further set of embodiments may include an apparatus, comprising a processor configured to cause a cellular base station to: establish a wireless link with a wireless device; provide control resource set (CORESET) configuration information to the wireless device, wherein the CORESET configuration information configures a search space with multiple CORESETs; and provide downlink control information (DCI) to the wireless device using a CORESET included in the search space configured with multiple CORESETs.

According to some embodiments, the CORESET configuration information configures the search space with a first CORESET associated with a first transmission reception point (TRP) and a second CORESET associated with a second TRP.

According to some embodiments, the CORESET configuration information configures each CORESET of the search space with a different beam configuration.

According to some embodiments, the CORESET configuration information configures different slot periodicity, slot offset, and/or symbols within a slot for each CORESET of the search space.

According to some embodiments, the processor is further configured to cause the cellular base station to: provide a media access control (MAC) control element (CE) configured to modify a beam configuration for each of the multiple CORESETs.

According to some embodiments, the processor is further configured to cause the cellular base station to: provide a media access control (MAC) control element (CE) configured to modify a beam configuration for each of multiple CORESETs associated with a different cellular base station.

According to some embodiments, the CORESET configuration information configures the search space with multiple CORESETs according to a transmission pattern that is one of: time division multiplexed such that the multiple CORESETs are non-overlapping in a time domain and a frequency domain resource allocation of the multiple CORESETs is the same; frequency division multiplexed such that the multiple CORESETs are non-overlapping in a frequency domain and a time domain resource allocation of the multiple CORESETs is the same; time and frequency division multiplexed such that the multiple CORESETs are non-overlapping in the time domain and also non-overlapping in the frequency domain; spatial division multiplexed such that the multiple CORESETs are fully overlapping in both the time domain and the frequency domain.

A yet further set of embodiments may include a cellular base station, comprising: an antenna; a radio operably coupled to the antenna; and a processor operably coupled to the radio; wherein the cellular base station is configured to: establish a wireless link with a wireless device; and provide downlink control channel configuration information to the wireless device, wherein the downlink control channel configuration information configures control resources associated with multiple transmission reception points (TRPs) in a search space for the wireless device.

According to some embodiments, the downlink control channel configuration information configures multiple control resource sets (CORESETs) in the search space, wherein each CORESET in the search space is associated with a different TRP.

According to some embodiments, for wireless device blind decoding hypothesis testing, the multiple CORESETs in the search space are configured with one or more of: a same periodicity; a same control channel element (CCE) to resource element group (REG) mapping; a same REG bundle size configuration; or a same physical downlink control channel (PDCCH) candidate configuration.

According to some embodiments, the downlink control channel configuration information configures multiple transmission control indicators (TCIs) for a control resource set (CORESET), wherein each TCI is associated with a different TRP, wherein the downlink control channel configuration information configures physical downlink control channel (PDCCH) repetition, wherein different repetitions are associated with different TRPs.

According to some embodiments, the cellular base station is further configured to: provide at least a portion of a downlink control information (DC) payload that is jointly encoded by a first TRP provided by the cellular base station and a second TRP to the wireless device using control resources included in the search space.

According to some embodiments, the cellular base station is further configured to: provide a repetition of a downlink control information (DCI) payload using control resources included in the search space, wherein at least one repetition of the DCI payload encoded in the same way is also provided to the wireless device by a second TRP using control resources included in the search space.

According to some embodiments, the cellular base station is further configured to: provide a repetition of a downlink control information (DCI) payload using control resources included in the search space, wherein at least one repetition of the DCI payload encoded with a different redundancy version is also provided to the wireless device by a second TRP using control resources included in the search space.

A still further set of embodiments may include a method, comprising: by a cellular base station: establishing a wireless link with a wireless device; providing downlink control channel configuration information to the wireless device, wherein the downlink control channel configuration information configures control resources associated with multiple transmission reception points (TRPs) in a search space for the wireless device: and providing downlink control information (DCI) to the wireless device using control resources included in the search space.

According to some embodiments, the downlink control channel configuration information configures multiple control resource sets (CORESETs) in the search space, wherein each CORESET in the search space is associated with a different TRP.

According to some embodiments, the downlink control channel configuration information configures the multiple CORESETs in the search space with the same physical downlink control channel (PDCCH) candidate aggregation level configuration and number of PDCCH candidates per aggregation level, wherein a one-to-one mapping between PDCCH candidates in each CORESET is configured for the wireless device when performing blind decoding of the search space.

According to some embodiments, the downlink control channel configuration information configures different CORESETs of the search space with one or more of: different beam configurations; different slot periodicities; different slot offsets; or different symbols within a slot.

According to some embodiments, the downlink control channel configuration information configures multiple transmission control indicators (TCIs) for a control resource set (CORESET), wherein each TCI is associated with a different TRP.

According to some embodiments, a one-to-one mapping between PDCCH candidates associated with each TCI is configured for the wireless device when performing blind decoding of the search space.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

Another exemplary set of embodiments may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
communicating via a wireless link with a cellular base station;
receiving downlink control channel configuration information from the cellular base station, wherein the downlink control channel configuration information configures control resources associated with multiple transmission reception points (TRPs) for a wireless device, wherein the control resources comprise multiple control resource sets (CORESETs), wherein each CORESET of the multiple CORESETS is associated with a different TRP, wherein the downlink control channel configuration information configures physical downlink control channel (PDCCH) candidate searching in the multiple CORESETs with a same number of PDCCH candidates per aggregation level and a one-to-one mapping between the PDCCH candidates; and
performing downlink control channel candidate blind decoding during a monitoring occasion configured by the downlink control channel configuration information.

2. The method of claim 1,
wherein the downlink control channel configuration information configures different CORESETs of the multiple CORESETS with one or more of:
different beam configurations;
different slot periodicities;
different slot offsets; or
different symbols within a slot.

3. The method of claim 1,
wherein the downlink control channel configuration information configures multiple transmission control indicators (TCIs) for a CORESET, wherein each TCI is associated with a different TRP.

4. The method of claim 1, wherein, for wireless device blind decoding hypothesis testing, the CORESETs of the multiple CORESETS are configured with a same periodicity.

5. The method of claim 1, wherein, for wireless device blind decoding hypothesis testing, the CORESETs of the multiple CORESETS are configured with at least one of:
a same control channel element (CCE) to resource element group (REG) mapping; or
a same REG bundle size configuration.

6. The method of claim 1, further comprising:
receiving downlink control information (DCI) based at least in part on the blind decoding performed during the monitoring occasion configured by the downlink control channel configuration information configured with control resources associated with multiple TRPs.

7. The method of claim 6, wherein a payload of the DCI is received from each of at least two TRPs, wherein the payload is received with a different redundancy version from each of the at least two TRPs.

8. A baseband processor comprising circuitry configured to perform operations comprising:

communicating via a wireless link with a cellular base station;

receiving downlink control channel configuration information from the cellular base station, wherein the downlink control channel configuration information configures control resources associated with multiple transmission reception points (TRPs) for a wireless device, wherein the control resources comprise multiple control resource sets (CORESETs), wherein each CORESET of the multiple CORESETS is associated with a different TRP, wherein the downlink control channel configuration information configures physical downlink control channel (PDCCH) candidate searching in the multiple CORESETs with a same number of PDCCH candidates per aggregation level and a one-to-one mapping between the PDCCH candidates; and performing downlink control channel candidate blind decoding during a monitoring occasion configured by the downlink control channel configuration information.

9. The baseband processor of claim 8,
wherein the downlink control channel configuration information configures different CORESETs of the multiple CORESETS with one or more of:
different beam configurations;
different slot periodicities;
different slot offsets; or
different symbols within a slot.

10. The baseband processor of claim 8,
wherein the downlink control channel configuration information configures multiple transmission control indicators (TCIs) for a CORESET, wherein each TCI is associated with a different TRP.

11. The baseband processor of claim 8, wherein, for wireless device blind decoding hypothesis testing, the CORESETs of the multiple CORESETS are configured with a same periodicity.

12. The baseband processor of claim 8, wherein, for wireless device blind decoding hypothesis testing, the CORESETs of the multiple CORESETS are configured with at least one of:
a same control channel element (CCE) to resource element group (REG) mapping; or
a same REG bundle size configuration.

13. The baseband processor of claim 8, the operations further comprising:
receiving downlink control information (DCI) based at least in part on the blind decoding performed during the monitoring occasion configured the downlink control channel configuration information configured with control resources associated with multiple TRPs.

14. The baseband processor of claim 13, wherein a payload of the DCI is received from each of at least two TRPs, wherein the payload is received with a different redundancy version from each of the at least two TRPs.

15. A method, comprising:
communicating via a wireless link with a wireless device; and
transmitting, to the wireless device, downlink control channel configuration information, wherein the downlink control channel configuration information configures control resources associated with multiple transmission reception points (TRPs) for the wireless device, wherein the control resources comprise multiple control resource sets (CORESETs), wherein each CORESET of the multiple CORESETS is associated with a different TRP, wherein the downlink control channel configuration information configures physical downlink control channel (PDCCH) candidate searching in the multiple CORESETs with a same number of PDCCH candidates per aggregation level and a one-to-one mapping between the PDCCH candidates, wherein the downlink control channel configuration information is useable for performing downlink control channel candidate blind decoding during a monitoring occasion configured by the downlink control channel configuration information.

16. The method of claim 15,
wherein the downlink control channel configuration information configures different CORESETs of the multiple CORESETS with one or more of:
different beam configurations;
different slot periodicities;
different slot offsets; or
different symbols within a slot.

17. The method of claim 15,
wherein the downlink control channel configuration information configures multiple transmission control indicators (TCIs) for a CORESET, wherein each TCI is associated with a different TRP.

18. The method of claim 15, wherein, for wireless device blind decoding hypothesis testing, the CORESETs of the multiple CORESETS are configured with a same periodicity.

19. The method of claim 15, further comprising:
transmitting, to the wireless device, downlink control information (DCI) based at least in part on the blind decoding performed during the monitoring occasion configured by the downlink control channel configuration information configured with control resources associated with multiple TRPs.

20. The method of claim 19, wherein a payload of the DCI is transmitted from each of at least two TRPs, wherein the payload is transmitted with a different redundancy version from each of the at least two TRPs.

* * * * *